(12) United States Patent
Cheng et al.

(10) Patent No.: US 10,079,781 B2
(45) Date of Patent: Sep. 18, 2018

(54) FORWARDING TABLE SYNCHRONIZATION METHOD, NETWORK DEVICE, AND SYSTEM

(71) Applicant: HUAWEI TECHNOLOGIES CO., LTD., Shenzhen, Guangdong (CN)

(72) Inventors: Pu Cheng, Nanjing (CN); Yinqiao Xie, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 15/432,762

(22) Filed: Feb. 14, 2017

(65) Prior Publication Data

US 2017/0163572 A1 Jun. 8, 2017

Related U.S. Application Data

(63) Continuation of application No. PCT/CN2014/085944, filed on Sep. 4, 2014.

(51) Int. Cl.
*H04L 12/935* (2013.01)
*H04L 12/755* (2013.01)
*H04L 12/709* (2013.01)

(52) U.S. Cl.
CPC ........ *H04L 49/3009* (2013.01); *H04L 45/021* (2013.01); *H04L 45/245* (2013.01)

(58) Field of Classification Search
CPC .................... H04L 49/3009; H04L 42/245
See application file for complete search history.

(56) References Cited

U.S. PATENT DOCUMENTS 6,810,427 B1 * 10/2004 Cain ................... H04L 49/3009
709/238
7,903,554 B1    3/2011 Manur et al.
(Continued)

FOREIGN PATENT DOCUMENTS

CN      1725761 A      1/2006
CN    101277219 A     10/2008
(Continued)

OTHER PUBLICATIONS

Henk Birkholz et al., "Supporting Security Automation for Multi-Chassis Link Aggregation Groups via the Interconnected-asset Ontology", 2014 9th International Conference on Availability, Reliability and Security, Sep. 2014, total 8 pages.
(Continued)

*Primary Examiner* — Zhiren Qin
(74) *Attorney, Agent, or Firm* — Huawei Technologies Co., Ltd.

(57) ABSTRACT

A data plane of a first network device receives a first packet sent by a multi-homing access device, sends the first packet to a control plane of the first network device, adds an MC-LAG identifier to the first packet to obtain a second packet, and sends the second packet to a data plane of a second network device through a data forwarding path. The control plane generates a forwarding entry according to an ingress port of the first packet on the first network device and the first packet, updates a first forwarding table on the control plane according to the forwarding entry, and sends the forwarding entry to the data plane of the first network device. The data plane of the first network device updates a second forwarding table on the data plane of the first network device according to the forwarding entry.

16 Claims, 7 Drawing Sheets

(56) References Cited

U.S. PATENT DOCUMENTS

| | | | |
|---|---|---|---|
| 8,787,149 | B1 | 7/2014 | Ramanathan et al. |
| 2003/0210705 | A1* | 11/2003 | Seddigh .................. H04L 45/10 370/419 |
| 2008/0240133 | A1* | 10/2008 | Tanaka .................. H04L 45/245 370/401 |
| 2010/0278180 | A1 | 11/2010 | Ma |
| 2011/0194562 | A1 | 8/2011 | Simmons et al. |
| 2012/0128005 | A1 | 5/2012 | Tatsumi et al. |
| 2012/0236859 | A1 | 9/2012 | Subramanian et al. |
| 2013/0064137 | A1 | 3/2013 | Santoso et al. |
| 2013/0073711 | A1 | 3/2013 | Hanka et al. |
| 2013/0259058 | A1* | 10/2013 | Vairavakkalai ....... H04L 45/023 370/401 |
| 2014/0003227 | A1* | 1/2014 | Scudder ................ H04L 45/021 370/218 |
| 2014/0140346 | A1* | 5/2014 | Kumagai ................ H04L 45/74 370/392 |
| 2014/0204760 | A1* | 7/2014 | Durrani .................. H04L 47/41 370/236 |
| 2014/0219081 | A1 | 8/2014 | Natarajan et al. |
| 2014/0301401 | A1* | 10/2014 | Wang ...................... H04L 49/70 370/395.53 |
| 2016/0065463 | A1 | 3/2016 | Wang et al. |

FOREIGN PATENT DOCUMENTS

| | | |
|---|---|---|
| CN | 101877667 A | 11/2010 |
| CN | 102148677 A | 8/2011 |
| CN | 103098424 A | 5/2013 |
| CN | 103166874 A | 6/2013 |
| CN | 103414801 A | 11/2013 |
| CN | 103929461 A | 7/2014 |
| EP | 2670089 A1 | 12/2013 |
| JP | 2014107592 A | 6/2014 |
| JP | 2014131338 A | 7/2014 |
| JP | 2015515809 A | 5/2015 |
| WO | 2013/148303 A1 | 10/2013 |

OTHER PUBLICATIONS

XP068008118 Rick van 't Spijker, "Multiple Systems Link Aggregation Control Protocol", Dissertation for Master of Science-Mobile and Distributed Computer Networks, Leeds Metropolitan University, dated May 31, 2010, total 78 pages.

* cited by examiner

FORWARDING TABLE SYNCHRONIZATION METHOD, NETWORK DEVICE, AND SYSTEM

CROSS-REFERENCE TO RELATED APPLICATIONS

This application is a continuation of International Application No. PCT/CN2014/085944, filed on Sep. 4, 2014, the disclosure of which is hereby incorporated by reference in its entirety.

TECHNICAL FIELD

The present disclosure relates to the communications field, and in particular, to a forwarding table synchronization method, a network device, and a system.

BACKGROUND

A link aggregation group (LAG) is obtained by bundling, by using an inverse multiplexing method based on multiple Ethernet links, multiple links connected to one device, so as to increase link bandwidth, provide redundancy backup, and improve link reliability. Multiple links in a link aggregation group may be considered as one logical link. On an Ethernet network, each link corresponds to a port. Therefore, link aggregation is also referred to as port aggregation. All ports in the link aggregation group share one MAC address.

A multi-chassis link aggregation group (MC-LAG) further provides device-level redundancy in addition to link-level redundancy provided by the LAG, and allows multiple network devices to be connected to one multi-homing access device. For the multi-homing access device, the multiple network devices are represented as one logical LAG. Multiple network devices included in an MC-LAG may be switches, routers, or the like. The multi-homing access device may be a network device such as a switch or a router, or may be a non-network device such as a server or a host.

Figure 1:
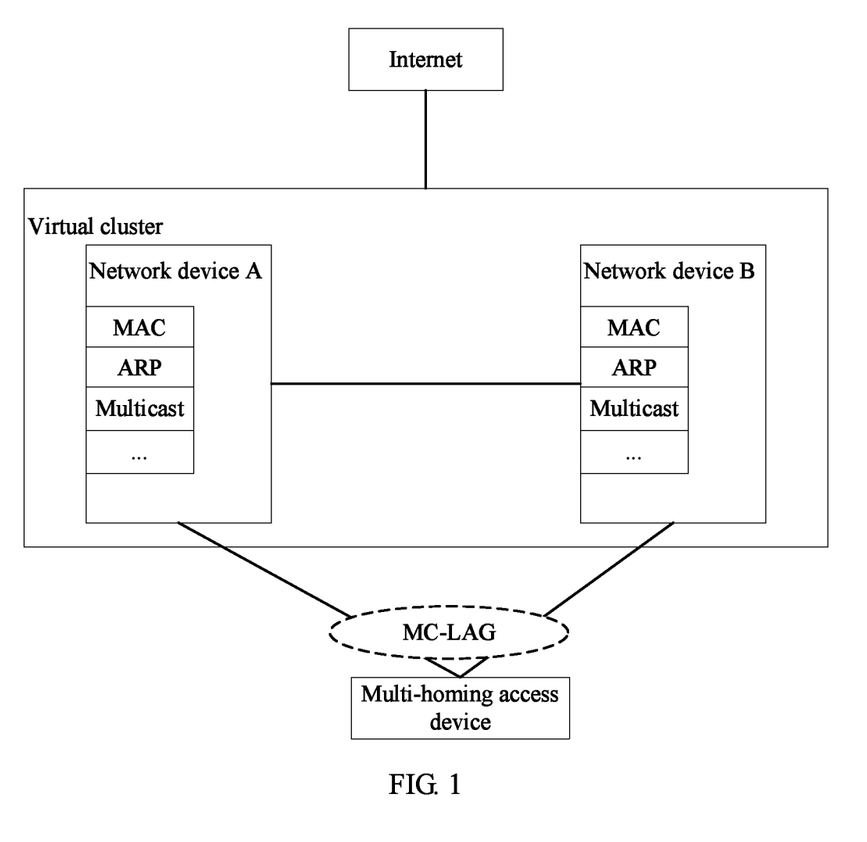
FIG. 1 is a schematic structural diagram of an MC-LAG in the prior art.

As shown in FIG. 1, FIG. 1 is a schematic structural diagram of an MC-LAG. A multi-homing access device accesses the Internet by using a virtual cluster. The virtual cluster includes at least two network devices, and FIG. 1 shows a network device A and a network device B. Links that respectively connect the at least two network devices to the multi-homing access device form an MC-LAG. From the perspective of the multi-homing access device, there is only one link, that is, the MC-LAG. The at least two network devices can implement both load sharing and mutual backup. The load sharing means that the at least two network devices separately forward some traffic of the multi-homing access device that is determined according to a specific rule. The mutual backup means that when any one of the at least two network devices fails, traffic on the faulty network device may be switched in real time to another network device that does not fail, so as to ensure an uninterrupted user service.

To forward a service flow, a forwarding table used for forwarding the service flow needs to be generated on a network device. As shown in FIG. 1, the forwarding table may include at least one of a media access control (MAC) address table, an Address Resolution Protocol (ARP) table, a multicast table, or a routing table. In addition, there may further be another forwarding table. To implement load sharing and mutual backup on the at least two network devices, forwarding tables on the at least two network devices need to be consistent. The consistency means that each of the forwarding tables on the two network devices needs to include forwarding entries of all service flows on the multi-homing access device. Therefore, forwarding table synchronization needs to be performed between the at least two network devices. When a control plane and a data plane of a network device are separate, a forwarding table of a control plane of each network device needs to be consistent with a forwarding table of a data plane of the network device.

To achieve consistency of forwarding tables, some systems perform forwarding table synchronization between control planes of the at least two network devices. Then, the control planes of the at least two network devices respectively send synchronized forwarding tables to corresponding data planes. But this has a disadvantage: forwarding table synchronization needs to be performed between the control planes of the at least two network devices in the virtual cluster periodically or in real time. However, control protocol packets sent between the control planes have a requirement for software compatibility, that is, the at least two network devices are required to identify a same control protocol. Therefore, after a software version of a network device is upgraded, a software version of another network device needs to be upgraded correspondingly, resulting in complex implementation. In addition, when software versions of the at least two network devices are not upgraded simultaneously, the forwarding tables on the at least two network devices are inconsistent, resulting in a traffic forwarding error and a user service interruption.

SUMMARY

The present disclosure provides a forwarding table synchronization method, a network device, and a system, to keep forwarding tables consistent.

A first aspect of the present disclosure provides a forwarding table synchronization method, which is applied to a virtual cluster, where the virtual cluster includes at least a first network device and a second network device, the first network device communicates with the second network device through a data forwarding path, the first network device and the second network device are connected to a multi-homing access device respectively through a first link and a second link, and the first link and the second link form a multi-chassis link aggregation group MC-LAG; and the method includes:

receiving, by a data plane of the first network device, a first packet sent by the multi-homing access device; sending an ingress port of the first packet on the first network device and the first packet to a control plane of the first network device; adding an MC-LAG identifier to the first packet to obtain a second packet; and sending the second packet to a data plane of the second network device through the data forwarding path, where the MC-LAG identifier is used to indicate that the ingress port of the first packet on the first network device is a member port of the MC-LAG;

generating, by the control plane of the first network device, a forwarding entry according to the ingress port of the first packet on the first network device and the first packet; updating a first forwarding table on the control plane of the first network device according to the forwarding entry; and sending the forwarding entry to the data plane of the first network device; and receiving, by the data plane of the first network device, the forwarding entry sent by the control plane of the first network device; and updating a second forwarding table on the data plane of the first network device according to the forwarding entry.

With reference to the first aspect, in a first implementation manner of the first aspect, the adding, by the data plane of the first network device, an MC-LAG identifier to the first packet includes:

obtaining, by the data plane of the first network device, according to the ingress port of the first packet on the first network device and a preconfigured MC-LAG table including a correspondence between an MC-LAG identifier of each MC-LAG and member ports of the each MC-LAG, an MC-LAG identifier corresponding to the ingress port; and adding the obtained MC-LAG identifier to the first packet.

With reference to the first aspect or the first implementation manner of the first aspect, in a second implementation manner of the first aspect, the sending, by the data plane of the first network device, an ingress port of the first packet on the first network device and the first packet to a control plane of the first network device includes:

determining, by the data plane of the first network device, whether the first packet matches a packet selection rule delivered by the control plane of the first network device; and if the first packet matches the packet selection rule delivered by the control plane, sending the ingress port of the first packet on the first network device and the first packet to the control plane of the first network device.

A second aspect of the present disclosure provides another forwarding table synchronization method, which is applied to a virtual cluster, where the virtual cluster includes at least a first network device and a second network device, the first network device communicates with the second network device through a data forwarding path, the first network device and the second network device are connected to a multi-homing access device respectively through a first link and a second link, and the first link and the second link form a multi-chassis link aggregation group MC-LAG; and the method includes:

receiving, by a data plane of the second network device through the data forwarding path, a second packet sent by a data plane of the first network device, where the second packet is generated after the first network device adds an MC-LAG identifier to a first packet sent by the multi-homing access device, and the MC-LAG identifier is used to indicate that an ingress port of the first packet on the first network device is a member port of the MC-LAG;

obtaining, by the data plane of the second network device, the first packet according to the second packet;

determining, by the data plane of the second network device, an ingress port of the first packet on the second network device; and sending the determined ingress port and the first packet to a control plane of the second network device;

generating, by the control plane of the second network device, a forwarding entry according to the determined ingress port and the first packet; updating a first forwarding table on the control plane according to the forwarding entry; and sending the forwarding entry to the data plane of the second network device; and receiving, by the data plane of the second network device, the forwarding entry sent by the control plane of the second network device; and updating a second forwarding table on the data plane of the second network device according to the forwarding entry.

With reference to the second aspect, in a first implementation manner of the second aspect, the obtaining the first packet according to the second packet includes:

deleting, by the data plane of the second network device, the MC-LAG identifier from the second packet to obtain the first packet.

With reference to the second aspect or the first implementation manner of the second aspect, in a second implementation manner of the second aspect, the determining an ingress port of the first packet on the second network device includes:

obtaining, by the data plane of the second network device, the MC-LAG identifier according to the second packet; obtaining a port, corresponding to the MC-LAG identifier, of the second network device according to a preconfigured MC-LAG table including a correspondence between an MC-LAG identifier of each MC-LAG and member ports of the each MC-LAG; and using the obtained port as the ingress port of the first packet on the second network device.

A third aspect of the present disclosure provides a network device, which is applied to a virtual cluster, where the virtual cluster includes at least the network device and another network device, the network device communicates with the another network device through a data forwarding path, the network device and the another network device are connected to a multi-homing access device respectively through a first link and a second link, and the first link and the second link form a multi-chassis link aggregation group MC-LAG; and the network device includes a control plane and a data plane, where the data plane is configured to: receive a first packet sent by the multi-homing access device; send an ingress port of the first packet on the network device and the first packet to the control plane; add an MC-LAG identifier to the first packet to obtain a second packet; and send the second packet to a data plane of the another network device through the data forwarding path, where the MC-LAG identifier is used to indicate that the ingress port of the first packet on the network device is a member port of the MC-LAG;

the control plane is configured to: generate a forwarding entry according to the ingress port of the first packet on the network device and the first packet; update a first forwarding table on the control plane according to the forwarding entry; and send the forwarding entry to the data plane; and the data plane is further configured to: receive the forwarding entry sent by the control plane; and update a second forwarding table on the data plane according to the forwarding entry.

With reference to the third aspect, in a first implementation manner of the third aspect, when adding the MC-LAG identifier to the first packet, the data plane is specifically configured to:

obtain, according to the ingress port of the first packet on the network device and a preconfigured MC-LAG table including a correspondence between an MC-LAG identifier of each MC-LAG and member ports of the each MC-LAG, an MC-LAG identifier corresponding to the ingress port; and add the obtained MC-LAG identifier to the first packet.

With reference to the third aspect or the first implementation manner of the third aspect, in a second implementation manner of the third aspect, when sending the ingress port of the first packet on the network device and the first packet to the control plane, the data plane is specifically configured to:

determine whether the first packet matches a packet selection rule delivered by the control plane; and if the first packet matches the packet selection rule delivered by the control plane, send the ingress port of the first packet on the network device and the first packet to the control plane.

A fourth aspect of the present disclosure provides a network device, which is applied to a virtual cluster, where the virtual cluster includes at least the network device and another network device, the network device communicates with the another network device through a data forwarding path, the network device and the another network device are connected to a multi-homing access device respectively through a first link and a second link, and the first link and the second link form a multi-chassis link aggregation group MC-LAG; and the network device includes a control plane and a data plane, where the data plane is configured to: receive, through the data forwarding path, a second packet sent by a data plane of the another network device, where the second packet is generated after the another network device adds an MC-LAG identifier to a first packet sent by the multi-homing access device, and the MC-LAG identifier is used to indicate that an ingress port of the first packet on the another network device is a member port of the MC-LAG; obtain the first packet according to the second packet; determine an ingress port of the first packet on the network device; and send the determined ingress port and the first packet to the control plane;

the control plane is configured to: generate a forwarding entry according to the determined ingress port and the first packet; update a first forwarding table on the control plane according to the forwarding entry; and send the forwarding entry to the data plane; and the data plane is further configured to: receive the forwarding entry sent by the control plane; and update a second forwarding table on the data plane according to the forwarding entry.

With reference to the fourth aspect, in a first implementation manner of the fourth aspect, when obtaining the first packet according to the second packet, the data plane is specifically configured to delete the MC-LAG identifier from the second packet to obtain the first packet.

With reference to the fourth aspect or the first implementation manner of the fourth aspect, in a second implementation manner of the fourth aspect, when determining the ingress port of the first packet on the network device, the data plane is specifically configured to:

obtain the MC-LAG identifier according to the second packet; obtain a port, corresponding to the MC-LAG identifier, of the network device according to a preconfigured MC-LAG table including a correspondence between an MC-LAG identifier of each MC-LAG and member ports of the each MC-LAG; and use the obtained port as the ingress port of the first packet on the network device.

A fifth aspect of the present disclosure provides a forwarding table synchronization system, where the system includes a first network device and a second network device, the first network device is the network device according to the third aspect, or the first or the second implementation manner of the third aspect; and the second network device is the network device according to the fourth aspect, or the first or the second implementation manner of the fourth aspect.

In the present disclosure, after receiving a first packet sent by a multi-homing access device, a data plane of a first network device in a virtual cluster sends the first packet to a control plane of the first network device, adds an MC-LAG identifier to the first packet to obtain a second packet, and sends the second packet to a data plane of a second network device in the virtual cluster through a data forwarding path; the data plane of the second network device deletes the MC-LAG identifier from the second packet to obtain the first packet, determines an ingress port of the first packet on the second network, and sends the determined ingress port and the first packet to a control plane of the second network device; the control plane of the first network device generates a forwarding entry according to an ingress port of the first packet on the first network device and the first packet; and the control plane of the second network device generates a forwarding entry according to the determined ingress port and the first packet. According to embodiments of the present disclosure, consistency of forwarding tables on multiple network devices is achieved through a data forwarding path between the multiple network devices in a virtual cluster, and the multiple network devices do not need to support a same software version, and software versions of the multiple network devices do not need to be compatible with each other either. This can avoid a problem that forwarding tables of the multiple network devices are inconsistent because the software versions of the multiple network devices are not upgraded simultaneously, and further can avoid a traffic forwarding error and a user service interruption.

BRIEF DESCRIPTION OF DRAWINGS

To describe the technical solutions in the embodiments of the present disclosure or in the prior art more clearly, the following briefly describes the accompanying drawings required for describing the embodiments or the prior art.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 2:
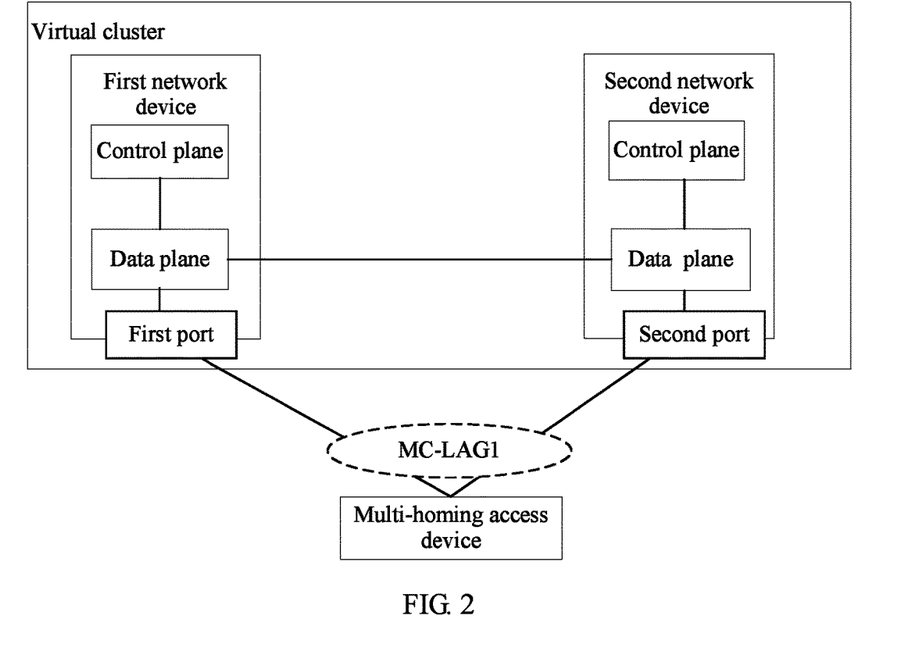
FIG. 2 is a schematic structural diagram of a forwarding table synchronization system according to an embodiment of the present disclosure.

FIG. 2 is a schematic structural diagram of a forwarding table synchronization system according to an embodiment of the present disclosure. The system includes a multi-homing access device and at least two network devices; each network device includes a control plane and a data plane. The at least two network devices include a first network device and a second network device. The first network device and the second network device form a virtual cluster, and the first network device and the second network device share one virtual Media Access Control MAC address and one virtual IP address. The first network device is any network device in the virtual cluster, and the second network device is a network device in the virtual cluster except the first network device. A first link that connects a first port of the first network device to the multi-homing access device, and a second link that connects a second port of the second network device to the multi-homing access device form an MC-LAG. An MC-LAG identifier of the MC-LAG is MC-LAG1, and the first port and the second port are member ports of the MC-LAG1. The multi-homing access device communicates with the virtual cluster by using MC-LAG1. An MC-LAG table can be preconfigured on both the first network device and the second network device. The MC-LAG table is used to store a correspondence between an MC-LAG identifier of each MC-LAG and member ports of the each MC-LAG. In the embodiment shown in FIG. 2, both the MC-LAG table on the first network device and the MC-LAG table on the second network device include an entry {MC-LAG1, the first port, and the second port}. The first network device communicates with the second network device through a data forwarding path.

Figure 3:
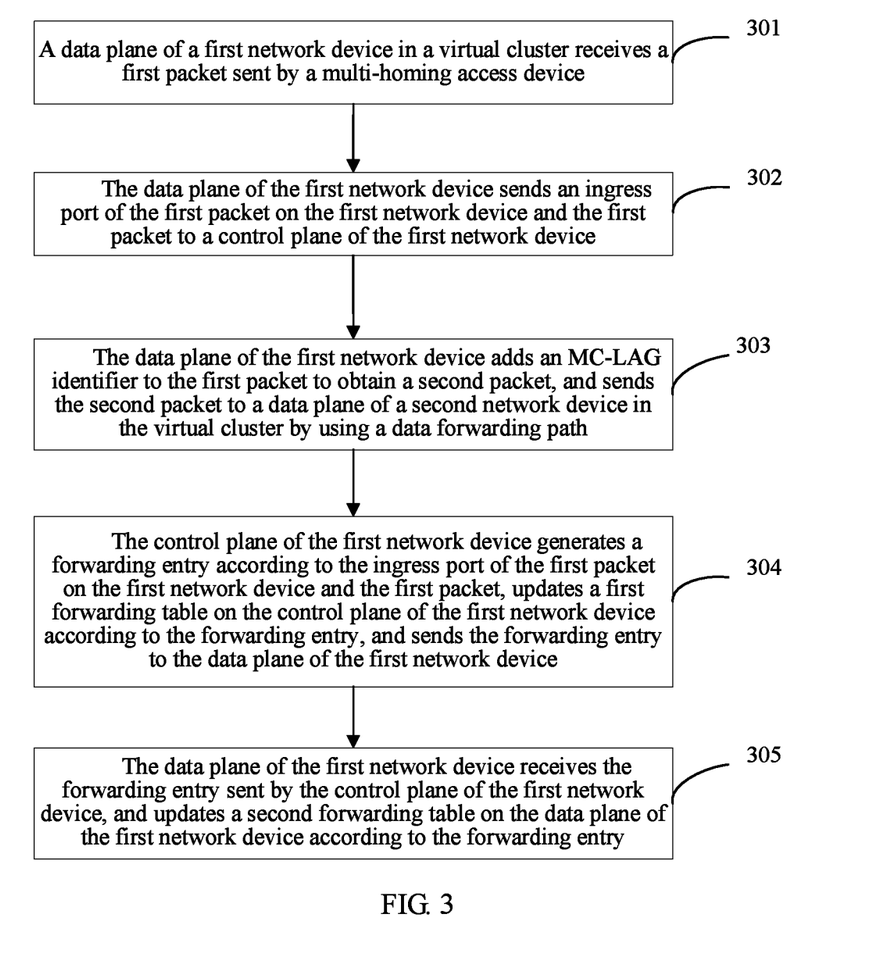
FIG. 3 is a schematic flowchart of a forwarding table synchronization method according to an embodiment of the present disclosure.

Based on the system shown in FIG. 2, an embodiment of the present disclosure provides a forwarding table synchronization method, which is applied to a virtual cluster. The virtual cluster includes at least a first network device and a second network device, the first network device communicates with the second network device through a data forwarding path, the first network device and the second network device are connected to a multi-homing access device respectively through a first link and a second link, and the first link and the second link form a multi-chassis link aggregation group MC-LAG. As shown in FIG. 3, the method includes the following steps.

301. A data plane of the first network device in the virtual cluster receives a first packet sent by the multi-homing access device.

When the multi-homing access device needs to access a network, the multi-homing access device selects a link in the MC-LAG according to a load sharing rule to send the first packet to the virtual cluster. In this embodiment, the link selected by the multi-homing access device is a link that connects the first network device to the multi-homing access device. The first packet is sent by the multi-homing access device to the data plane of the first network device through the link that connects the first network device to the multi-homing access device. The first packet may be a broadcast packet, and may be specifically an ARP packet or a Dynamic Host Configuration Protocol (DHCP) packet.

302. The data plane of the first network device sends an ingress port of the first packet on the first network device and the first packet to a control plane of the first network device.

After receiving the first packet, the data plane of the first network device determines whether the first packet matches a packet selection rule delivered by the control plane; and if the first packet matches the packet selection rule delivered by the control plane, sends the ingress port of the first packet on the first network device and the first packet to the control plane of the first network device. The packet selection rule is: selecting a packet of a particular type, for example, an ARP packet or a DHCP packet. That the first packet matches the packet selection rule delivered by the control plane may be: The first packet is an ARP packet or a DHCP packet. The packet selection rule may alternatively be: selecting a packet including particular information, for example, selecting a packet in which an IP address, a MAC address, or a virtual local area network identifier (VLAN ID) belongs to a specific range or is a particular value. That the first packet matches the packet selection rule delivered by the control plane may be: an IP address, a MAC address, or a VLAN ID in the first packet belongs to the specific range or is the particular value. The sending the ingress port of the first packet on the first network device and the first packet to the control plane of the first network device may include: sending both the ingress port of the first packet on the first network device and the first packet to the control plane of the first network device; or adding the ingress port of the first packet on the first network device to the first packet, and sending, to the control plane of the first network device, the first packet to which the ingress port is added.

303. The data plane of the first network device adds an MC-LAG identifier to the first packet to obtain a second packet, and sends the second packet to a data plane of the second network device in the virtual cluster through the data forwarding path, where the MC-LAG identifier is used to indicate that the ingress port of the first packet on the first network device is a member port of the MC-LAG.

Specifically, the first network device obtains, according to the ingress port of the first packet on the first network device and a preconfigured MC-LAG table including a correspondence between an MC-LAG identifier of each MC-LAG and member ports of the each MC-LAG, an MC-LAG identifier corresponding to the ingress port, where the ingress port of the first packet on the first network device is the first port shown in FIG. 2; and adds the obtained MC-LAG identifier to the first packet to obtain the second packet. No limitation is imposed on execution sequences of step 302 and step 303.

304. The control plane of the first network device generates a forwarding entry according to the ingress port of the first packet on the first network device and the first packet, updates a first forwarding table on the control plane of the first network device according to the forwarding entry, and sends the forwarding entry to the data plane of the first network device.

The forwarding entry that is generated according to the ingress port of the first packet on the first network device and the first packet is a forwarding entry corresponding to the first packet. The forwarding entry may include at least one of the IP address, the MAC address, or the VLAN ID included in the first packet. The first forwarding table includes at least one of a MAC address table, an ARP table, a multicast table, or a routing table.

305. The data plane of the first network device receives the forwarding entry sent by the control plane of the first network device, and updates a second forwarding table on the data plane of the first network device according to the forwarding entry.

The first forwarding table and the second forwarding table of the first network device are the same in content after the two forwarding tables are updated.

Figure 4:
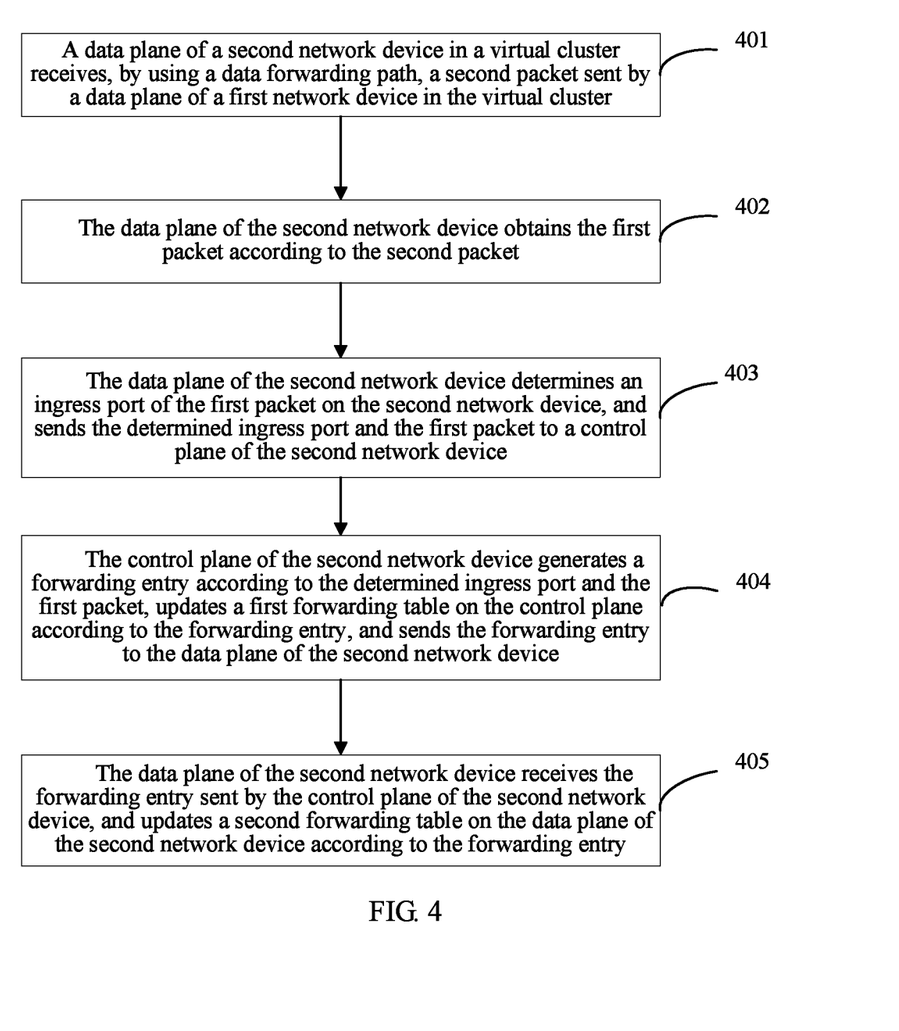
FIG. 4 is a schematic flowchart of another forwarding table synchronization method according to an embodiment of the present disclosure.

Corresponding to the method shown in FIG. 3, an embodiment of the present disclosure further provides another forwarding table synchronization method, which is applied to a virtual cluster. The virtual cluster includes at least a first network device and a second network device, the first network device communicates with the second network device through a data forwarding path, the first network device and the second network device are connected to a multi-homing access device respectively through a first link and a second link, and the first link and the second link form a multi-chassis link aggregation group MC-LAG. As shown in FIG. 4, the method includes the following steps.

401. A data plane of the second network device in the virtual cluster receives, through the data forwarding path, a second packet sent by a data plane of the first network device in the virtual cluster, where the second packet is generated after the first network device adds an MC-LAG identifier to a first packet sent by the multi-homing access device, and the MC-LAG identifier is used to indicate that an ingress port of the first packet on the first network device is a member port of the MC-LAG.

402. The data plane of the second network device obtains the first packet according to the second packet.

The obtaining, by the data plane of the second network device, the first packet according to the second packet includes:

deleting, by the data plane of the second network device, the MC-LAG identifier from the second packet to obtain the first packet.

403. The data plane of the second network device determines an ingress port of the first packet on the second network device, and sends the determined ingress port and the first packet to a control plane of the second network device.

The determining an ingress port of the first packet on the second network device includes:

obtaining, by the data plane of the second network device, the MC-LAG identifier according to the second packet; obtaining a port, corresponding to the MC-LAG identifier, of the second network device according to a preconfigured MC-LAG table including a correspondence between an MC-LAG identifier of each MC-LAG and member ports of the each MC-LAG; and using the obtained port as the ingress port of the first packet on the second network device. The determined ingress port is a member port, of the MC-LAG, on the second network device.

The sending the determined ingress port and the first packet to a control plane of the second network device includes: sending both the determined ingress port and the first packet to the control plane of the second network device; or adding the determined ingress port to the first packet, and sending, to the control plane of the second network device, the first packet to which the determined ingress port is added.

404. The control plane of the second network device generates a forwarding entry according to the determined ingress port and the first packet, updates a first forwarding table on the control plane according to the forwarding entry, and sends the forwarding entry to the data plane of the second network device.

A rule for generating the forwarding entry by the control plane of the second network device is the same as a rule for generating a forwarding entry by a control plane of the first network device. Therefore, for the forwarding entry generated by the control plane of the second network device according to the first packet, all content, except an ingress port and an egress port, is the same as that of the forwarding entry generated by the control plane of the first network device according to the first packet. In this case, it is considered that the forwarding entries generated by the control plane of the first network device and the control plane of the second network device are consistent.

405. The data plane of the second network device receives the forwarding entry sent by the control plane of the second network device, and updates a second forwarding table on the data plane of the second network device according to the forwarding entry.

The first forwarding table and the second forwarding table of the second network device are the same in content after the two forwarding tables are updated.

In the embodiments of the present disclosure that are corresponding to FIG. 3 and FIG. 4, the first network device and the second network device separately generate a forwarding entry for a service flow to which the first packet belongs.

Figure 5:
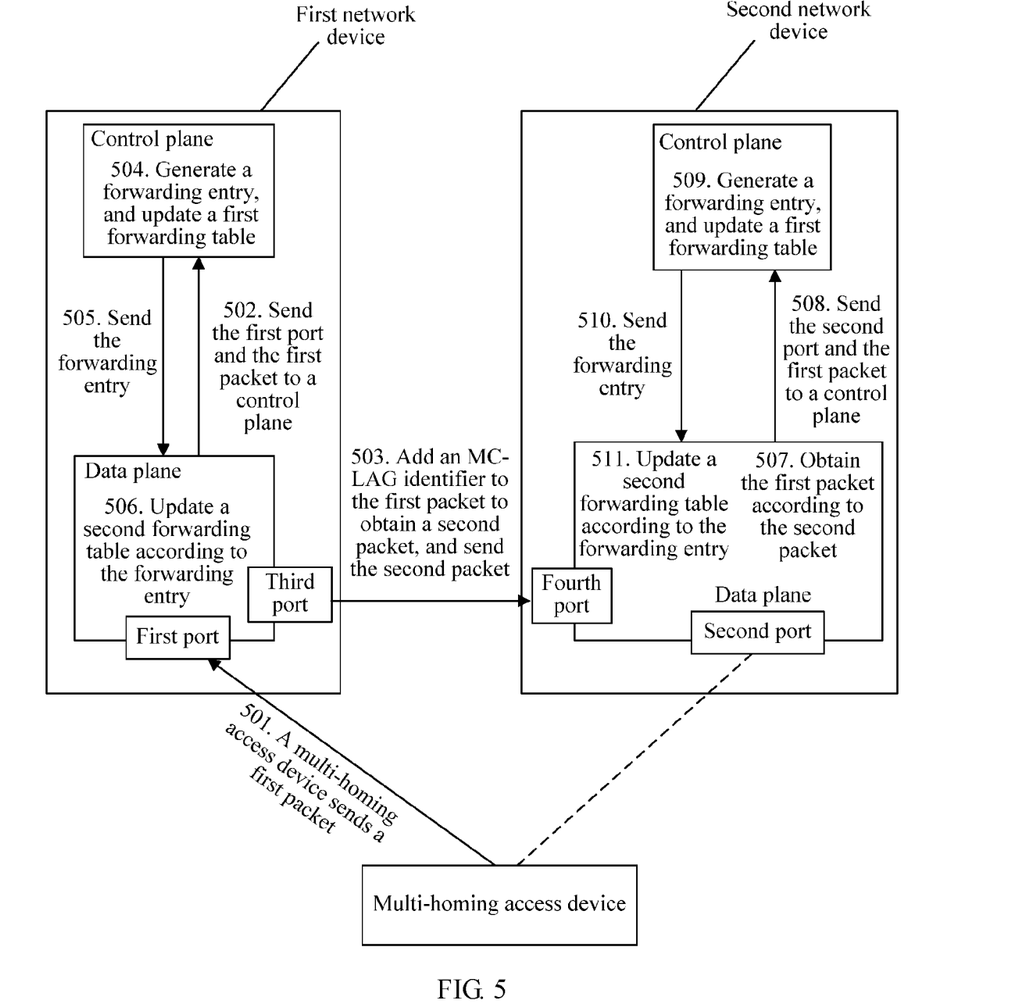
FIG. 5 is a schematic signaling diagram of another forwarding table synchronization method according to an embodiment of the present disclosure.

As shown in FIG. 5, an embodiment of the present disclosure further provides another forwarding table synchronization method. The method includes the following steps.

501. A data plane of a first network device receives, by using a first port, a first packet sent by a multi-homing access device.

The first packet may be a data packet or a protocol packet. The first port and a second port that is on a second network device are member ports of a same MC-LAG. The first network device and the second network device form a virtual cluster.

502. The data plane of the first network device sends the first port and the first packet to a control plane of the first network device.

503. The data plane of the first network device adds an MC-LAG identifier to the first packet to obtain a second packet, and sends the second packet to a data plane of a second network device by using a third port on the first network device.

504. The control plane of the first network device generates a forwarding entry according to the ingress port of the first packet on the first network device and the first packet, and updates a first forwarding table on the control plane of the first network device according to the forwarding entry.

505. The control plane of the first network device sends the forwarding entry to the data plane of the first network device.

506. The data plane of the first network device receives the forwarding entry sent by the control plane of the first network device, and updates a second forwarding table on the data plane of the first network device according to the forwarding entry.

507. After receiving, by using a fourth port, the second packet sent by the data plane of the first network device, the data plane of the second network device obtains the first packet according to the second packet.

508. The data plane of the second network device determines an ingress port of the first packet on the second network device, and sends the determined ingress port and the first packet to a control plane of the second network device.

509. The control plane of the second network device generates a forwarding entry according to the determined ingress port and the first packet, and updates a first forwarding table on the control plane according to the forwarding entry.

510. The control plane of the second network device sends the forwarding entry to the data plane of the second network device.

511. The data plane of the second network device receives the forwarding entry sent by the control plane of the second network device, and updates a second forwarding table on the data plane of the second network device according to the forwarding entry.

In the foregoing steps, for details about the steps involving the first network device, refer to the descriptions in FIG. 3; for details about the steps involving the second network device, refer to the descriptions in FIG. 4. No limitation is imposed on execution sequences among steps 502 to 506, step 503, and steps 506 to 511.

In the foregoing embodiment of the present disclosure, after receiving a first packet sent by a multi-homing access device, a data plane of a first network device in a virtual cluster sends the first packet to a control plane of the first network device, adds an MC-LAG identifier to the first packet to obtain a second packet, and sends the second packet to a data plane of a second network device in the virtual cluster through a data forwarding path; the data plane of the second network device deletes the MC-LAG identifier from the second packet to obtain the first packet, determines an ingress port of the first packet on the second network, and sends the determined ingress port and the first packet to a control plane of the second network device; the control plane of the first network device generates a forwarding entry according to an ingress port of the first packet on the first network device and the first packet; and the control plane of the second network device generates a forwarding entry according to the determined ingress port and the first packet. According to this embodiment of the present disclosure, consistency of forwarding tables on multiple network devices is achieved through a data forwarding path between the multiple network devices in a virtual cluster, and the multiple network devices do not need to support a same software version, and software versions of the multiple network devices do not need to be compatible with each other either. This can avoid a problem that forwarding tables of the at least two network devices are inconsistent because the software versions of the multiple network devices are not upgraded simultaneously, and further can avoid a traffic forwarding error and a user service interruption.

Figure 6:
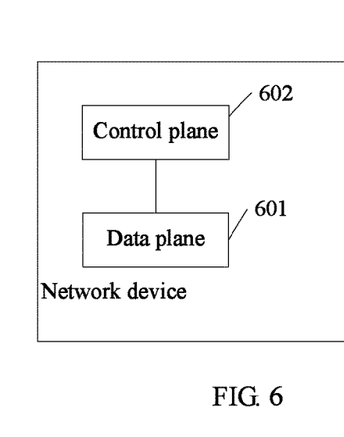
FIG. 6 is a schematic structural diagram of a network device according to an embodiment of the present disclosure.

Based on the system shown in FIG. 2 and the methods shown in FIG. 3 and FIG. 5, an embodiment of the present disclosure further provides a network device 600. The network device 600 and another network device form a virtual cluster, the network device and the another network device are connected to a multi-homing access device respectively through a first link and a second link, and the first link and the second link form a multi-chassis link aggregation group MC-LAG. As shown in FIG. 6, the network device 600 includes a control plane 602 and a data plane 601.

The data plane 601 is configured to: receive a first packet sent by the multi-homing access device; send an ingress port of the first packet on the network device and the first packet to the control plane; add an MC-LAG identifier to the first packet to obtain a second packet; and send the second packet to a data plane of the another network device through a data forwarding path. The MC-LAG identifier is used to indicate that the ingress port of the first packet on the network device is a member port of the MC-LAG.

The control plane 602 is configured to: generate a forwarding entry according to the ingress port of the first packet on the network device and the first packet; update a first forwarding table on the control plane according to the forwarding entry; and send the forwarding entry to the data plane 601.

The data plane 601 is further configured to: receive the forwarding entry sent by the control plane; and update a second forwarding table on the data plane according to the forwarding entry.

When adding the MC-LAG identifier to the first packet, the data plane 601 is specifically configured to: obtain, according to the ingress port of the first packet on the network device and a preconfigured MC-LAG table including a correspondence between an MC-LAG identifier of each MC-LAG and member ports of the each MC-LAG, an MC-LAG identifier corresponding to the ingress port; and add the obtained MC-LAG identifier to the first packet.

When sending the ingress port of the first packet on the network device and the first packet to the control plane 602, the data plane 601 is specifically configured to: determine whether the first packet matches a packet selection rule delivered by the control plane 602; and if the first packet matches the packet selection rule, send the ingress port of the first packet on the network device and the first packet to the control plane 602.

Figure 7:
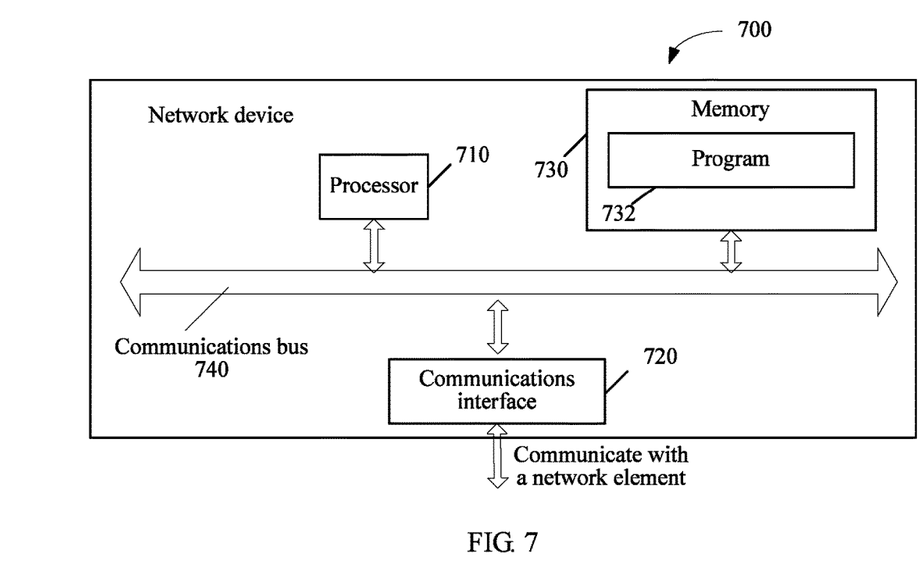
FIG. 7 is a schematic structural diagram of hardware of the network device shown in FIG. 6.

An embodiment of the present disclosure further provides a network device 700. As shown in FIG. 7, the network device 700 includes:

a processor 710, a communications interface 720, a memory 730, and a bus 740.

The processor 710, the communications interface 720, and the memory 730 communicate with each other by using the bus 740.

The communications interface 720 is configured to communicate with an external network element. In an implementation manner, the communications interface 720 is configured to communicate with a multi-homing access device and another network device that is in a virtual cluster. The communications interface 720 may be implemented by using an optical transceiver, an electrical transceiver, a radio transceiver, or any combination thereof. For example, the optical transceiver may be a small form-factor pluggable (SFP) transceiver, an enhanced small form-factor pluggable (SFP+) transceiver, or a 10 Gigabit small form-factor pluggable (XFP) transceiver. The electrical transceiver may be an Ethernet network interface controller (NIC). The radio transceiver may be a wireless network interface controller (WNIC). The communications interface 720 may include multiple physical interfaces. For example, the communications interface 720 includes multiple Ethernet interfaces.

The processor 710 is configured to execute a program 732.

Specifically, the program 732 may include program code, and the program code includes a computer operation instructions.

The processor 710 may be a central processing unit (CPU), or an application-specific integrated circuit (ASIC).

The memory 730 is configured to store the program 732. The memory 730 may include a volatile memory, for example, a random access memory (RAM). The memory 730 may include a non-volatile memory, for example, a read-only memory (ROM), a flash memory, a hard disk drive (HDD), or a solid-state drive (SSD). Alternatively, the memory 730 may include a combination of the foregoing types of memories.

The processor 710 is configured to: invoke the program 732 in the memory, and perform, according to the program 732, the steps that are performed by the first network device in FIG. 3 or FIG. 5.

For content that is not described in detail in FIG. 6 and FIG. 7, refer to the descriptions in the embodiment of FIG. 3.

Figure 8:
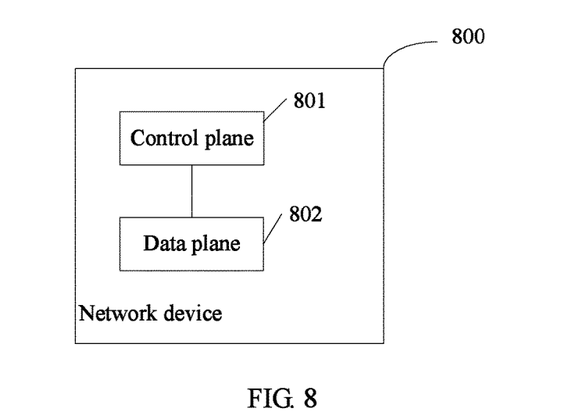
FIG. 8 is a schematic structural diagram of another network device according to an embodiment of the present disclosure.

Based on the system shown in FIG. 2 and the methods shown in FIG. 4 and FIG. 5, an embodiment of the present disclosure further provides a network device 800. The network device 800 and another network device form a virtual cluster, the network device and the another network device are connected to a multi-homing access device respectively through a first link and a second link, and the first link and the second link form a multi-chassis link aggregation group MC-LAG. As shown in FIG. 8, the network device 800 includes a control plane 801 and a data plane 802.

The data plane 802 is configured to: receive, through a data forwarding path, a second packet sent by a data plane of the another network device, where the second packet is generated after the another network device adds an MC-LAG identifier to a first packet sent by the multi-homing access device, and the MC-LAG identifier is used to indicate that an ingress port of the first packet on the another network device is a member port of the MC-LAG; obtain the first packet according to the second packet; determine an ingress port of the first packet on the network device; and send the determined ingress port and the first packet to the control plane 801.

The control plane 801 is configured to: generate a forwarding entry according to the determined ingress port and the first packet; update a first forwarding table on the control plane 801 according to the forwarding entry; and send the forwarding entry to the data plane 802.

The data plane 802 is further configured to: receive the forwarding entry sent by the control plane 801; and update a second forwarding table on the data plane 802 according to the forwarding entry.

When obtaining the first packet according to the second packet, the data plane 802 is specifically configured to delete the MC-LAG identifier from the second packet to obtain the first packet.

When determining the ingress port of the first packet on the network device, the data plane 802 is specifically configured to:

obtain the MC-LAG identifier according to the second packet; obtain a port, corresponding to the MC-LAG identifier, of the network device according to a preconfigured MC-LAG table including a correspondence between an MC-LAG identifier of each MC-LAG and member ports of the each MC-LAG; and use the obtained port as the ingress port of the first packet on the network device.

Figure 9:
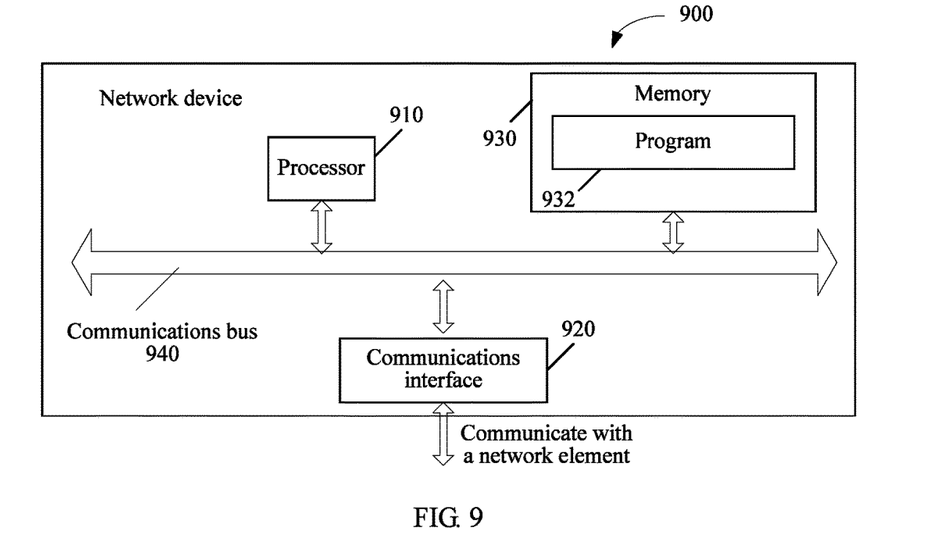
FIG. 9 is a schematic structural diagram of hardware of the network device shown in FIG. 8.

An embodiment of the present disclosure further provides a network device 900. As shown in FIG. 9, the apparatus 900 includes:

a processor 910, a communications interface 920, a memory 930, and a bus 940.

The processor 910, the communications interface 920, and the memory 930 communicate with each other by using the bus 940.

The communications interface 920 is configured to communicate with an external network element. In an implementation manner, the communications interface 920 is configured to communicate with a multi-homing access device and another network device that is in a virtual cluster. For implementation of the communications interface 920, refer to the communications interface 720.

The processor 910 is configured to execute a program 932.

Specifically, the program 932 may include program code, and the program code includes a computer operation instructions.

The processor 910 may be a CPU, or an ASIC.

The memory 930 is configured to store the program 932. For implementation of the memory 930, refer to the memory 730.

The processor 910 is configured to: invoke the program 932 in the memory, and perform, according to the program 932, the steps that are performed by the second network device in FIG. 4 or FIG. 5.

For content that is not described in detail in FIG. 8 and FIG. 9, refer to the descriptions in the embodiments of FIG. 4 and FIG. 5.

In the foregoing embodiment of the present disclosure, after receiving a first packet sent by a multi-homing access device, a data plane of a first network device in a virtual cluster sends the first packet to a control plane of the first network device, adds an MC-LAG identifier to the first packet to obtain a second packet, and sends the second packet to a data plane of a second network device in the virtual cluster through a data forwarding path; the data plane of the second network device deletes the MC-LAG identifier from the second packet to obtain the first packet, determines an ingress port of the first packet on the second network, and sends the determined ingress port and the first packet to a control plane of the second network device; the control plane of the first network device generates a forwarding entry according to an ingress port of the first packet on the first network device and the first packet; and the control plane of the second network device generates a forwarding entry according to the determined ingress port and the first packet. According to this embodiment of the present disclosure, consistency of forwarding tables on multiple network devices is achieved through a data forwarding path between the multiple network devices in a virtual cluster, and the multiple network devices do not need to support a same software version, and software versions of the multiple network devices do not need to be compatible with each other either. This can avoid a problem that forwarding tables of the at least two network devices are inconsistent because the software versions of the multiple network devices are not upgraded simultaneously, and further can avoid a traffic forwarding error and a user service interruption.

The foregoing descriptions are merely examples of embodiments of the present disclosure, but are not intended to limit the present disclosure. Any modification, equivalent replacement, and improvement made without departing from the principle of the present disclosure shall fall within the protection scope of the present disclosure.

What is claimed is:

1. A forwarding table synchronization method, applied to a virtual cluster, wherein the virtual cluster comprises at least a first network device and a second network device, the first network device communicates with the second network device through a data forwarding path, the first network device and the second network device are connected to a multi-homing access device respectively through a first link and a second link, and the first link and the second link form a multi-chassis link aggregation group (MC-LAG), the method comprising:

performing by a data plane of the first network device:
  receiving a first packet sent by the multi-homing access device;
  sending an ingress port of the first packet on the first network device and the first packet to a control plane of the first network device;
  adding an MC-LAG identifier to the first packet to obtain a second packet; and
  sending the second packet to a data plane of the second network device through the data forwarding path, wherein the MC-LAG identifier is used to indicate that the ingress port of the first packet on the first network device is a member port of the MC-LAG;
performing by the control plane of the first network device:

generating a forwarding entry according to the ingress port of the first packet on the first network device and the first packet; and
updating a first forwarding table on the control plane of the first network device according to the forwarding entry; and sending the forwarding entry to the data plane of the first network device; and
performing by the data plane of the first network device:
receiving the forwarding entry sent by the control plane of the first network device; and
updating a second forwarding table on the data plane of the first network device according to the forwarding entry.

2. The method according to claim 1, wherein the adding an MC-LAG identifier to the first packet comprises:
obtaining, by the data plane of the first network device, according to the ingress port of the first packet on the first network device and a MC-LAG table comprising a correspondence between an MC-LAG identifier of each MC-LAG and member ports of the each MC-LAG, an MC-LAG identifier corresponding to the ingress port; and
adding the obtained MC-LAG identifier to the first packet.

3. The method according to claim 1, wherein the sending an ingress port of the first packet on the first network device and the first packet to a control plane of the first network device comprises:
determining, by the data plane of the first network device, whether the first packet matches a packet selection rule; and
if the first packet matches the packet selection rule, sending the ingress port of the first packet on the first network device and the first packet to the control plane of the first network device.

4. The method according to claim 2, wherein the sending an ingress port of the first packet on the first network device and the first packet to a control plane of the first network device comprises:
determining, by the data plane of the first network device, whether the first packet matches a packet selection; and
if the first packet matches the packet selection rule, sending the ingress port of the first packet on the first network device and the first packet to the control plane of the first network device.

5. A forwarding table synchronization method, applied to a virtual cluster, wherein the virtual cluster comprises at least a first network device and a second network device, the first network device communicates with the second network device through a data forwarding path, the first network device and the second network device are connected to a multi-homing access device respectively through a first link and a second link, and the first link and the second link form a multi-chassis link aggregation group (MC-LAG), the method comprising:
receiving, by a data plane of the second network device through the data forwarding path, a second packet sent by a data plane of the first network device, wherein the second packet is generated after the first network device adds an MC-LAG identifier to a first packet sent by the multi-homing access device, and the MC-LAG identifier is used to indicate that an ingress port of the first packet on the first network device is a member port of the MC-LAG;
performing by the data plane of the second network device:
obtaining the first packet according to the second packet;
determining an ingress port of the first packet on the second network device; and
sending the determined ingress port and the first packet to a control plane of the second network device;
performing by the control plane of the second network device:
generating a forwarding entry according to the determined ingress port and the first packet;
updating a first forwarding table on the control plane according to the forwarding entry; and
sending the forwarding entry to the data plane of the second network device; and
performing by the data plane of the second network device:
receiving the forwarding entry sent by the control plane of the second network device; and
updating a second forwarding table on the data plane of the second network device according to the forwarding entry.

6. The method according to claim 5, wherein the obtaining the first packet according to the second packet comprises:
deleting, by the data plane of the second network device, the MC-LAG identifier from the second packet to obtain the first packet.

7. The method according to claim 5, wherein the determining an ingress port of the first packet on the second network device comprises:
obtaining, by the data plane of the second network device, the MC-LAG identifier according to the second packet;
obtaining a port, corresponding to the MC-LAG identifier, of the second network device according to a MC-LAG table comprising a correspondence between an MC-LAG identifier of each MC-LAG and member ports of the each MC-LAG; and using the obtained port as the ingress port of the first packet on the second network device.

8. The method according to claim 6, wherein the determining an ingress port of the first packet on the second network device comprises:
obtaining a port, corresponding to the MC-LAG identifier from the second packet, of the second network device according to a MC-LAG table comprising a correspondence between an MC-LAG identifier of each MC-LAG and member ports of the each MC-LAG; and
using the obtained port as the ingress port of the first packet on the second network device.

9. A network device, applied to a virtual cluster, wherein the virtual cluster comprises at least the network device and another network device, the network device communicates with the other network device through a data forwarding path, the network device and the other network device are connected to a multi-homing access device respectively through a first link and a second link, and the first link and the second link form a multi-chassis link aggregation group (MC-LAG), the network device comprising:
a data plane configured to perform operations comprising:
receiving a first packet sent by the multi-homing access device;
sending an ingress port of the first packet on the network device and the first packet to a control plane;
adding an MC-LAG identifier to the first packet to obtain a second packet; and
sending the second packet to a data plane of the other network device through the data forwarding path, wherein the MC-LAG identifier is used to indicate that the ingress port of the first packet on the network device is a member port of the MC-LAG;

wherein the control plane is configured to perform operations comprising:
generating a forwarding entry according to the ingress port of the first packet on the network device and the first packet;
updating a first forwarding table on the control plane according to the forwarding entry; and
sending the forwarding entry to the data plane; and wherein the data plane is further configured to perform operations comprising:
receiving the forwarding entry sent by the control plane; and
updating a second forwarding table on the data plane according to the forwarding entry.

10. The network device according to claim 9, wherein adding the MC-LAG identifier to the first packet comprises:
obtaining, according to the ingress port of the first packet on the network device and a MC-LAG table comprising a correspondence between an MC-LAG identifier of each MC-LAG and member ports of the each MC-LAG, an MC-LAG identifier corresponding to the ingress port; and add the obtained MC-LAG identifier to the first packet.

11. The network device according to claim 9, wherein sending the ingress port of the first packet on the network device and the first packet to the control plane comprises:
determining whether the first packet matches a packet selection rule delivered by the control plane; and if the first packet matches the packet selection rule delivered by the control plane, sending the ingress port of the first packet on the network device and the first packet to the control plane.

12. The network device according to claim 10, wherein sending the ingress port of the first packet on the network device and the first packet to the control plane comprises:
determining whether the first packet matches a packet selection rule; and
if the first packet matches the packet selection rule, sending the ingress port of the first packet on the network device and the first packet to the control plane.

13. A network device, applied to a virtual cluster, wherein the virtual cluster comprises at least the network device and another network device, the network device communicates with the other network device through a data forwarding path, the network device and the other network device are connected to a multi-homing access device respectively through a first link and a second link, and the first link and the second link form a multi-chassis link aggregation group (MC-LAG), the network device comprising:
a data plane configured to perform operations comprising:
receiving, through the data forwarding path, a second packet sent by a data plane of the other network device, wherein the second packet is generated after the other network device adds an MC-LAG identifier to a first packet sent by the multi-homing access device, and the MC-LAG identifier is used to indicate that an ingress port of the first packet on the other network device is a member port of the MC-LAG;
obtaining the first packet according to the second packet; and
determining an ingress port of the first packet on the network device; and send the determined ingress port and the first packet to the control plane;

wherein the control plane is configured to perform operations comprising:
generating a forwarding entry according to the determined ingress port and the first packet;
updating a first forwarding table on the control plane according to the forwarding entry; and
sending the forwarding entry to the data plane; and wherein the data plane is further configured to perform operations comprising:
receiving the forwarding entry sent by the control plane; and
updating a second forwarding table on the data plane according to the forwarding entry.

14. The network device according to claim 13, wherein obtaining the first packet according to the second packet comprises deleting the MC-LAG identifier from the second packet to obtain the first packet.

15. The network device according to claim 13, wherein when determining the ingress port of the first packet on the network device comprises:
obtaining the MC-LAG identifier according to the second packet;
obtaining a port, corresponding to the MC-LAG identifier, of the network device according to a MC-LAG table comprising a correspondence between an MC-LAG identifier of each MC-LAG and member ports of the each MC-LAG; and
using the obtained port as the ingress port of the first packet on the network device.

16. The network device according to claim 14, wherein when determining the ingress port of the first packet on the network device comprises:
obtaining the MC-LAG identifier according to the second packet; obtain a port, corresponding to the MC-LAG identifier, of the network device according to a MC-LAG table comprising a correspondence between an MC-LAG identifier of each MC-LAG and member ports of the each MC-LAG; and
using the obtained port as the ingress port of the first packet on the network device.

* * * * *